No. 860,440.

PATENTED JULY 16, 1907.

W. BOYER.
PLANTER.
APPLICATION FILED APR. 8, 1907.

2 SHEETS—SHEET 1.

Inventor
William Boyer

Witnesses

By Victor J. Evans
Attorney

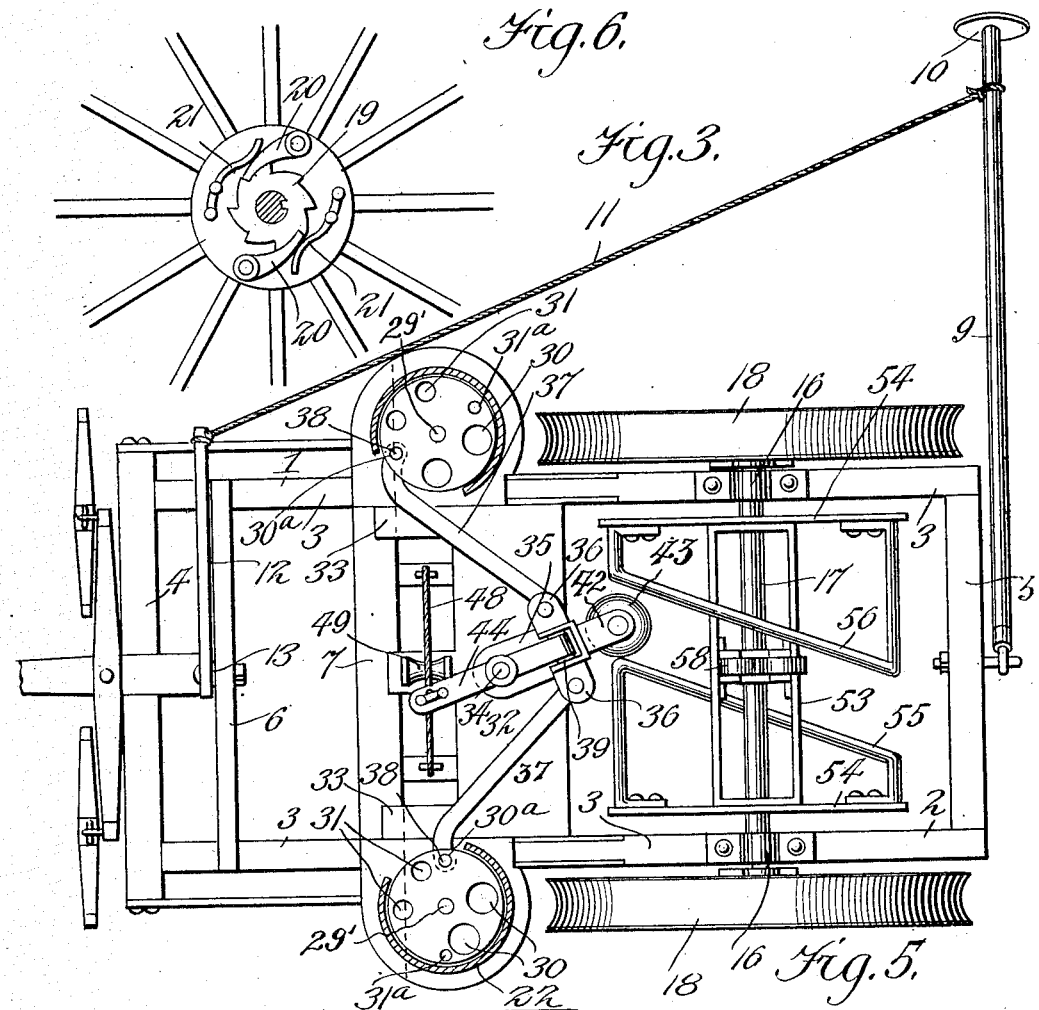

UNITED STATES PATENT OFFICE.

WILLIAM BOYER, OF REYNOLDS STATION, KENTUCKY.

PLANTER.

No. 860,440.　　　　Specification of Letters Patent.　　　　Patented July 16, 1907.

Application filed April 6, 1907. Serial No. 366,784.

*To all whom it may concern:*

Be it known that I, WILLIAM BOYER, a citizen of the United States of America, residing at Reynolds Station, in the county of Ohio and State of Kentucky, have invented new and useful Improvements in Planters, of which the following is a specification.

This invention relates to improvements in planters of that type in which the corn or other seed to be planted is intermittently fed from the hopper for deposit into the ground by the action of an oscillating feed disk having one or more feed openings therein to register with corresponding outlets in the bottom of the hopper, the object of the invention being to provide a planter of the double-feed type, to wit, having feed devices at opposite sides of a frame thereof for planting two rows at a time, wherein improved means are employed for alternately and intermittently operating the feed disks and simultaneously marking the hills or points of deposit of the seed, the construction and arrangement being such as to secure a free, easy and positive operation of the parts.

A further object of the invention is to generally simplify and improve the construction of planters of this type by the provision of a simple type of disk-operating devices actuated from the driving axle, such devices including a contact member adapted to be thrown into and out of operative position to start or stop the action of the seeding mechanism at will; and also to provide a seed dropping mechanism which is readily interchangeable for use in drilling and checking.

The preferred embodiment of the invention is illustrated in the accompanying drawings, in which:—

Figure 1:
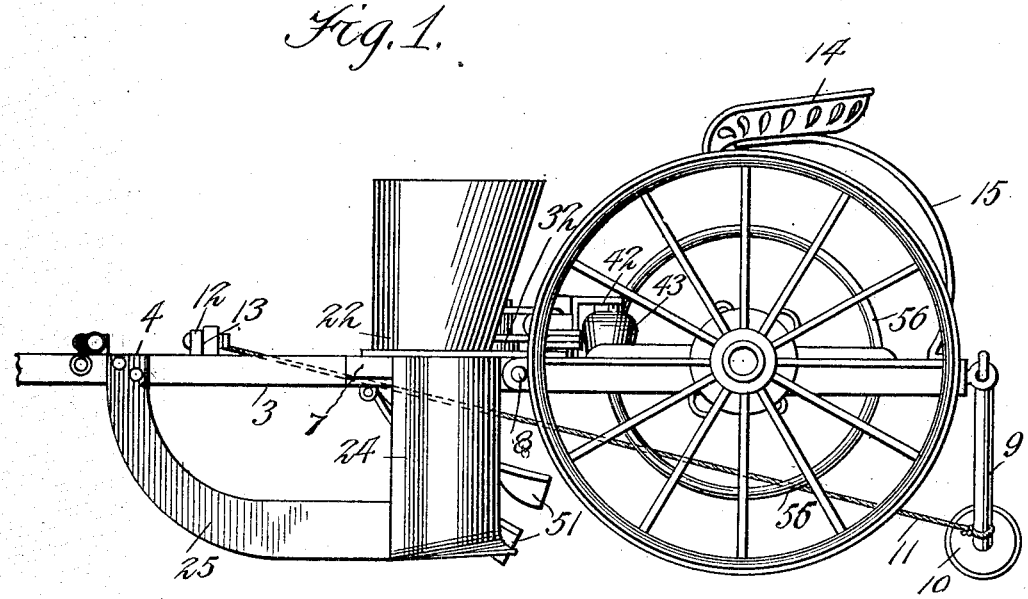
Figure 2:
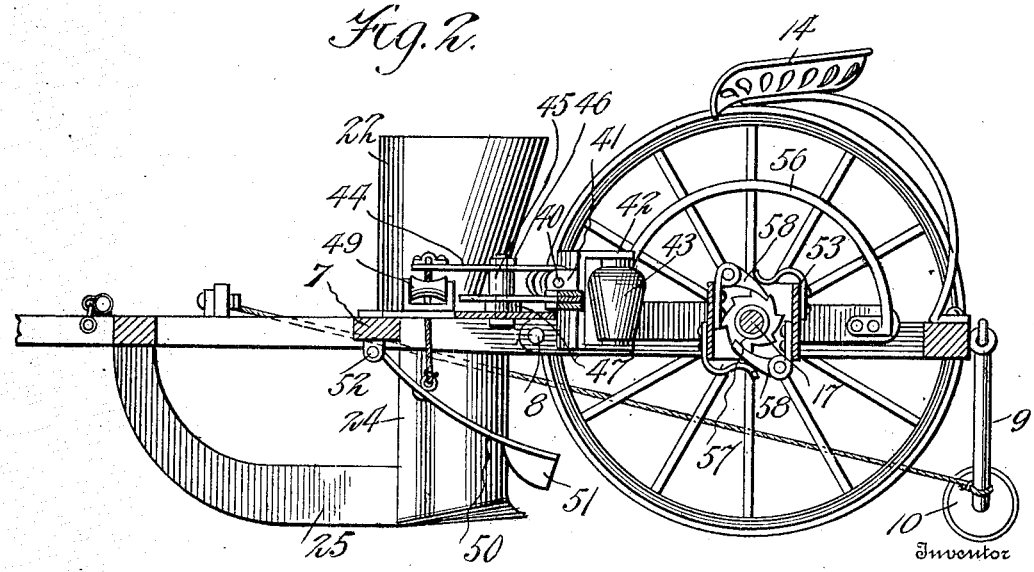

Figure 1 is a side elevation of the improved planter. Fig. 2 is a central vertical longitudinal section of the same. Fig. 3 is a top plan view with the hoppers shown in section. Fig. 4 is a vertical section through one of the hoppers and the feed disk therein. Fig. 5 is a horizontal section taken on the line 5—5 of Fig. 4. Fig. 6 is an inner elevation of one of the ground wheels, with the driving axle in cross section, showing the construction of the ratchet mechanism for permitting retrograde motion of the wheels in the operation of turning the planter.

As shown in the drawings, the frame of the planter is preferably of oblong rectangular form and comprises front and rear sections 1 and 2, each consisting of longitudinal side bars 3 connected respectively at their outer ends by cross bars 4 and 5, the side bars of the front section being further connected by supplementary cross bars 6 and 7. The side bars of the frame sections are pivotally connected at their meeting ends, as at 8, to permit them to have independent play to conform to inequalities in the surface of the ground, thus preventing undue stiffness or rigidity of the frame structure. Suitable draft attachments are provided upon and connected with the front cross bars 4 and 6, and to the rear cross bar 5 is pivotally secured one end of a rod or pole 9, carrying at its opposite or free end a revoluble cutting or scoring disk 10, thus forming a marking device which is adapted to be reversed for use upon either side of the frame to mark off the distance between rows. The marker is stayed by a cord or cable 11 attached at its rear end to the rod 9 and at its forward end to a swinging arm or lever 12 pivotally connected, as at 13, to the center of the cross bar 6, thus allowing said arm to be swung to either side of the center of the frame in the reversal of the marker. A driver's seat 14 is supported from the rear section of the frame by a standard 15 fixed to the cross bar 5.

The side bars of the frame section 2 are provided with bearings 16 for a transverse shaft or axle carrying combined supporting and covering wheels 18, which wheels are loosely mounted upon the shaft. Keyed to each end of the shaft is a ratchet wheel 19, the teeth of which are engaged by pawls 20 held in engaging position by springs 21, said pawls and springs being mounted upon the hub of the adjacent wheel. The pawl and ratchet mechanism associated with each wheel is provided to fix the same to the axle and permit the wheel to turn loosely in a backward direction when the planter is turned, the pawls engaging the teeth of the ratchets in the forward movement and slipping over the teeth in the rearward movement, as will be readily understood. These devices constitute no part of my invention, as they may be of any of the well known constructions in common use.

Arranged on each side of the section 1 of the frame is a hopper 22, having a bottom plate 23 secured to the adjacent side bar 3, which bottom plate is provided with one or more openings communicating with a guide chute 24 secured to and depending from the frame and into which the seed drop and by which they are conducted to the ground. In advance of each chute is disposed a shoe or furrow opener 25 secured thereto and to the frame in any suitable manner.

Each hopper is provided with an upper or false bottom 26 having oppositely arranged outlet openings 27 communicating with an underlying chamber 28 arranged between the same and the bottom proper 23, in which chamber is disposed a horizontal feed wheel or disk 29 mounted to oscillate upon a vertical shaft or axis 29'. This wheel or disk is formed with two sets or pairs of discharge openings 30 and 31 arranged at diametrically opposite sides thereof, and is also provided with oppositely arranged openings 30$^a$ and 31$^a$. The discharge openings 30 are larger than the openings 31 and designed to be used in "checking" or depositing the seed at regular intervals in hills, while the smaller openings 31 are intended to be employed in "drilling". A laterally shifting supporting plate 32 is arranged between the side bars of the frame and provided with forwardly extending arms 33 to rest upon the cross bar 7, said plate being otherwise free from connection with the frame. From the center of this plate rises a pivot bolt 34 upon which is mounted a laterally swinging head 35 carrying at its rear end lateral ears 36 to which are pivotally connected the rear ends of diverging links 37 provided at their forward ends with wrist pins or studs 38 to pivotally engage the openings 30ᵃ or 31ᵃ in the feed disks of the opposing hoppers. The head 35 is rigidly mounted on the bolt 34 to swing therewith and carries an angular head or boss 39 through which passes a pin or bolt 40 on which are pivotally mounted ears 41 extending forwardly from a U-shaped bracket 42, in which is journaled a contact member 43, preferably comprising a loosely rotating frusto-conical roller. Also fixedly mounted on the bolt 34 is a spring plate or arm 44 arranged above and spaced from the head by a sleeve 45 and held upon the bolt by a nut 46. The portions of the bolt upon which the head and arm are fixed are of polygonal form to engage correspondingly shaped openings in said parts, and in addition to the sleeve 45 spacing the head from the arm a sleeve or washer 47 is provided to space the head from the plate 32 to clear it in its movement, the lower end of the bolt turning loosely in the plate, as will be readily understood. The rear end of the plate 44 engages the polygonal boss 39 to prevent tilting movement of the bracket 42 and acts as a spring dog to hold said bracket in normal or operative position. The bracket may, however, be tilted upwardly and forwardly to a horizontal position against the spring pressure of said dog and maintained in such position by the engagement of the dog with another angular face of the boss, by which the bracket and the contact member 43 carried thereby may be thrown out of the path of the operating cams on the axle by which motion is transmitted thereto to operate the feed disks.

The contact member 43 is adapted to be alternately engaged by the cams on each half revolution of the axle 17 and swung laterally in opposite directions, thereby transmitting corresponding movements to the head 35 and through the same to the links 37, thus alternately oscillating the feed disks in opposite directions, in which movement the plate 32 also shifts slightly to permit free motion of the head and its supporting bolt 34. Assuming that the feed openings 30 are in use, it will thus be understood that the movement of each disk in one direction will move one of said openings into dropping register with one of the hopper outlets 27 and that the reverse movement of the disk will move the other opening 30 into register with the other hopper outlet 27, and that accordingly the reverse movements of the disks will result in the simultaneous deposit of seed in the hills of two adjoining rows. By disconnecting the studs or wrist pins 38 from the openings 30ᵃ and turning the disks to engage said studs with the openings 31ᵃ, the openings 30 will be thrown out of operative position and the openings 30 brought into position to coact with the outlets 27, thus rendering the disks reversible for use in the operations of checking and drilling.

To the forward end of the plate or arm 44 is attached a rope, cable or other flexible connection 48 arranged to move over a guiding and supporting pulley 49 carried by the plate 32, the ends of said connection being suitably attached to the shanks 50 of marking blades 51, said shanks being pivotally connected with the cross bar 7, as indicated at 52. In the reverse movements of the head 35 motion will be communicated to the connection 48 to elevate one of the markers 51 and permit the other to drop down into contact with the ground, thus marking the hills or points where the seed is deposited into the ground. It will be observed that the wheels 18 are arranged immediately in rear of the chutes 24, so that they will cover and pack the seed.

On the axle 17 is revolubly mounted a frame 53, to the ends of which are secured arms 54 which respectively carry actuating cams 55 and 56 adapted to engage the contact device 43. These cams are preferably formed by angularly bent and arcuately curved rods having their semicircular cam portions arranged obliquely to the center line of the frame in oppositely extending relation on opposite sides of the axle to alternately engage and shift the contact device 43 in opposite directions on each complete revolution of the axle, thereby effecting the operation of the dropping devices in an obvious manner. A ratchet wheel 57 is fixed to the axle and engaged by spring-actuated pawls 58 carried by the frame 53, the teeth of the ratchet wheel being so arranged that the said frame 17 and the cams carried thereby will be locked to the axle to rotate therewith on the forward motion of the planter, while the pawls will be permitted to slip over the teeth to prevent operation of the cams when the planter is backed.

From the foregoing description, taken in connection with the accompanying drawings, the construction and mode of operation of the device will be readily understood, and it will be seen that the invention provides a simple form of planter of the type described whereby an easy and efficient operation of the parts will be obtained, and the seed planted and the points of deposit of the same marked simultaneously.

Having thus described the invention, what is claimed as new, is:—

1. In a planter, the combination of a supporting frame carrying oppositely arranged hoppers, a drive shaft journaled on the frame, cams on the shaft, a head arranged to be laterally oscillated by said cams, oscillatory feed-disks in the hopper, operating connections between the head and feed disks, and markers carried by the frame and adapted to be alternately raised and lowered as the head oscillates.

2. In a planter, the combination of a supporting frame carrying oppositely arranged hoppers, a drive shaft journaled on the frame, cams on the shaft, an oscillating head arranged to be operated by the cams, oscillatory feed disks in the hoppers, links connecting the disks with the head, markers pivotally supported by the frame, and an operating connection between the markers and head for alternately raising and lowering the markers as the head oscillates.

3. In a planter, the combination of a supporting frame carrying oppositely arranged hoppers, a drive shaft journaled on the frame, cams carried by the shaft, an oscillating head arranged to be operated by the cams, feed disks in the hoppers having opposite sets of openings, links connected with the head and disks, said links and disks being adapted to be connected for the use of either set of openings, and markers connected with the head for alternate operation.

4. In a planter, the combination of a supporting frame carrying oppositely arranged hoppers, oscillatory discharge devices in the hoppers, means for operating said devices, and markers alternately operated simultaneously with the respective discharge devices.

5. In a planter, the combination of a supporting frame carrying oppositely arranged hoppers, a drive shaft journaled on the frame, cams on the shaft, an oscillatory head, an engaging device carried by the head and adapted to be engaged by the cams, said engaging device being adapted to be moved to an inoperative position, oscillatory feed disks in the hoppers, links connecting said disks with the head, pivoted markers, and a connection between the markers and the head, whereby the markers will be simultaneously operated in alternation with the respective feed disks.

In testimony whereof, I affix my signature in presence of two witnesses.

WILLIAM BOYER.

Witnesses:
  WILLIE BROOKS,
  J. W. HAYNES.